Patented Nov. 28, 1950

2,532,252

UNITED STATES PATENT OFFICE 2,532,252

MAKING PENTAERYTHRITOL

Joseph A. Wyler, Allentown, Pa., assignor to Trojan Powder Company, a corporation of New York No Drawing. Application July 27, 1948, Serial No. 40,980

1 Claim. (Cl. 260—635)

This invention relates to a process of making pentaerythritol including the monomer

di-, tri-, and other polypentaerythritols.

Commercial processes for the manufacture of the pentaerythritols are based upon the reaction of 1 mol of acetaldehyde with about 4 mols of formaldehyde, in aqueous alkali solution, the proportion of water present being at least four times the proportion of aldehydes at the beginning of the condensation. The main chemical reaction involved is represented by the following equation:

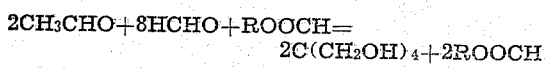

in which R represents an equivalent weight of a monovalent metal or divalent metal, as, for example, an atomic weight of sodium or potassium or half an atomic weight of calcium, barium or strontium.

In addition to this principal reaction, side reactions also occur, giving such substances as di-, tri- and tetrapentaerythritol in lesser proportions than the monomer and also small but appreciable amounts of other by-product materials or impurities.

Conventionally, the condensation liquor made as described above is processed to recover from it, by crystallization, the pentaerythritol (p. e.) present. Thus the condensation liquor is subjected to filtration to remove insoluble material, evaporated to give a solution nearly or completely saturated with pentaerythritol, and cooled to cause separation of crystals of the pentaerythritols. The crystals are separated from the mother liquor and the mother liquor is reprocessed once or twice more to give additional crops of crystals of useful products.

During the processing of the condensation liquor as described and particularly during the evaporation of it, as at temperatures up to about 100° C., reactions occur which produce sticky material that interferes with the crystallization of the pentaerythritols of proper purity and also produce colored bodies that give, to the crystals finally separated, an undesired yellow to brown color.

I have now discovered that treatment of the condensation liquor with hydrogen peroxide before beginning the evaporation step, in the processing of the said liquor, removes those products present which during the evaporation normally produce the color and stickiness encountered in separation of the pentaerythritols in crystalline form from the condensation liquor.

No other material has been found that is a satisfactory substitute for the hydrogen peroxide of this treatment, although there have been tried a large number of materials that in other reactions normally act in about the same manner as hydrogen peroxide. Thus, numerous oxidizing agents that I have tried are failures for my purpose, with the sole exception of the hydrogen peroxide.

The hydrogen peroxide is used in some commercially available and economical form, as for instance, as a 30% solution of hydrogen peroxide in water, that is, a solution containing 30 g. of hydrogen peroxide on the 100% basis to 100 g. of the solution. A usual stabilizing agent for peroxide in such solutions may be present.

In general the hydrogen peroxide solution is mixed with the condensation liquor resulting from the reaction of the two aldehydes in the aqueous alkaline medium and the resulting solution is maintained at the selected temperature until test of the solution by usual methods shows that the hydrogen peroxide present is substantially completely consumed. Then crystal-producing steps are followed in usual manner. These include filtration, evaporation, cooling and crystallizing, and separation and washing of the crystals so obtained.

The invention will be further illustrated by description in connection with the following specific examples of the practice of it.

In these examples and elsewhere herein proportions are expressed as parts by weight unless otherwise specifically stated.

Example 1

100 parts of a finished pentaerythritol condensation liquor containing about 10 parts of p. e. and poly p. e. and made from the interaction of acetaldehyde, formaldehyde and lime in aqueous medium, in accordance with the usual commercial process, such as described above, was mixed with 1 part of commercial hydrated lime (chemical grade) and the mixture stirred at room temperature. 3 parts of 30% hydrogen peroxide in aqueous solution were then added and the stirring continued for 1 hour. The mixture was filtered, the clear colorless filtrate was made just slightly acid with formic acid, evaporated to such concentration that pentaerythritol begins to crystallize, on cooling, at a temperature of 90° C., and then filtered at 95–100° C., to remove calcium formate. This filtrate was then cooled to about 20° C., to obtain pentaerythritol as colorless crystals. The latter were separated from the mother liquor by filtration and washed with cold water.

This newly formed mother liquor was similarly reevaporated to obtain more calcium formate and cooled to give another crop of colorless pentaerythritol crystals.

The mother liquor was reworked once more, after which it became too viscous for further convenient pentaerythritol separations but was useful for the manufacture of resins for linoleum and other industries.

Both the calcium formate and the pentaerythritol, which contained some dipentaerythritol and other polypentaerythritols, were obtained as white or colorless crystals.

*Example 2*

100 parts of a finished pentaerythritol condensation liquor, made from acetaldehyde, formaldehyde and lime, in aqueous medium, and containing 0.38% free formaldehyde, was mixed in the cold, with 1 part of commercial hydrated lime followed by the addition of 2 parts of 30% solution of hydrogen peroxide in water and the mixture stirred at room temperature for ½ hour. The mixture was then filtered and processed in the manner described under Example 1, to obtain the same kind of colorless or white crystals of calcium formate and pentaerythritol.

By analysis, the liquor after the half-hour treatment with hydrogen peroxide was found to contain no excess of hydrogen peroxide and 0.37% of formaldehyde. Since this is about the formaldehyde content at the start, it is evident that no significant amount of formaldehyde was consumed by the peroxide.

In general, the temperature at which the $H_2O_2$ is caused to react may be as low as 10° C. and as high as 40° C. If the temperatures are below 10° C., the reaction is incomplete and if the temperature is higher than 40° C. a loss in oxygen takes place, thereby increasing the costs of the process.

The hydrogen peroxide may be added all at once or in small portions over a period of an hour or more.

The reaction between the $H_2O_2$ and the pentaerythritol condensation liquor may be allowed to proceed for from ½ hour to several hours, say 6, before undertaking the other steps of the process of recovery of the crystalline products. The reaction is continued until the peroxide is substantially completely consumed.

In an experiment in which 1 part of 30% hydrogen peroxide per 100 parts of pentaerythritol condensation liquor was used, the effect was significant and of practical usefulness. The use of more than 5 parts of 30% $H_2O_2$ per 100 parts of the pentaerythritol condensation liquor served no useful purpose. Since the liquor contains about 10% of non-volatile organic materials, mostly pentaerythritol and its polymers, the proportion of peroxide to use is 10 to 50 parts peroxide on the 30% basis or 3 to 15 parts on the 100% basis for 100 parts of the said materials.

The process as described gives good clean crystals of the various pentaerythritols, with satisfactory yields.

While it might be expected that the peroxide would react with formaldehyde or acetaldehyde and thus cause loss of some at least of these materials remaining after the completion of the original condensation, it has been discovered that the reaction of the peroxide, in the proportion used, with such aldehydes is negligible. Instead the peroxide used is considered to react principally upon various unsaturated bodies present, unsaturated bodies which, if not destroyed by the peroxide, would cause the development of stickiness and color in the processing and crystallizing of the products in the condensation liquor. I consider that an important effect of the peroxide is oxidation of crotonaldehyde or like aldehydes including unsaturation between carbon atoms.

It will be understood that it is intended to cover all changes and modifications of the examples of the invention herein chosen for the purpose of illustration which do not constitute departures from the spirit and scope of the invention.

What I claim is:

In making pentaerythritol by the method including reacting acetaldehyde and formaldehyde in aqueous alkaline solution, to give first a condensation liquor including pentaerythritol and by-products of the condensation, the improvement which comprises mixing hydrogen peroxide with the condensation liquor without any previous evaporation thereof and at a temperature of 10° to 40° C., in the proportion of 3 to 15 parts by weight of the peroxide on the 100% basis for 100 parts of non-volatile organic materials in the said liquor, to destroy those of the by-products present that normally cause production of sticky and colored material during the subsequent evaporation, and then subjecting the resulting mixture to filtering, evaporating, and cooling, to produce crystals of pentaerythritol.

JOSEPH A. WYLER.

REFERENCES CITED

The following references are of record in the file of this patent:

UNITED STATES PATENTS

| Number | Name | Date |
|---|---|---|
| 2,372,602 | Owens | Mar. 27, 1945 |